(12) United States Patent
Eberle

(10) Patent No.: US 7,854,903 B2
(45) Date of Patent: Dec. 21, 2010

(54) REACTION CHAMBER SYSTEM FOR PROCESSING SAMPLES

(75) Inventor: Klaus Günter Eberle, Tuttlingen (DE)

(73) Assignee: Hettich AG, Bach (CH)

( * ) Notice: Subject to any disclaimer, the term of this patent is extended or adjusted under 35 U.S.C. 154(b) by 1287 days.

(21) Appl. No.: 10/542,243

(22) PCT Filed: Dec. 18, 2003

(86) PCT No.: PCT/EP03/14439

§ 371 (c)(1),
(2), (4) Date: Apr. 13, 2006

(87) PCT Pub. No.: WO2004/062806

PCT Pub. Date: Jul. 29, 2004

(65) Prior Publication Data

US 2006/0228267 A1    Oct. 12, 2006

(30) Foreign Application Priority Data

Jan. 15, 2003    (DE)    ................. 103 01 240

(51) Int. Cl.
*B01J 19/00*    (2006.01)
(52) U.S. Cl. .................. 422/130; 422/102; 422/99; 73/662; 73/663

(58) Field of Classification Search .................. 422/99, 422/130, 224, 102, 104; 222/234; 159/23, 159/DIG. 16, DIG. 11, 900, 1.1, 28.1; 73/662, 73/663, 669
See application file for complete search history.

(56) References Cited

U.S. PATENT DOCUMENTS

| 3,304,990 A * | 2/1967 | Ontko et al. ................. 159/6.1 |
| 3,944,188 A | 3/1976 | Parker et al. |
| 3,977,935 A | 8/1976 | Kowarski |
| 5,834,739 A | 11/1998 | Lockwood et al. |
| 6,652,813 B1 | 11/2003 | Dobelin |

FOREIGN PATENT DOCUMENTS

WO    WO 00/13761    3/2000

* cited by examiner

*Primary Examiner*—Natalia Levkovich
(74) *Attorney, Agent, or Firm*—William J. Sapone; Coleman Sudol Sapone P.C.

(57) ABSTRACT

The invention relates to a reaction chamber system (10, 70) for processing samples, comprising a reaction chamber (12), a sample carrier (26) arranged at least in the reaction chamber (12). When in operation, said sample carrier can be displaced in relation to the reaction chamber (12) by means of a drive device (30) which is coupled to the sample carrier (26). The reaction chamber system also comprises heating means (50) for warming the samples. The invention is characterized in that the heating means (50, 54) are arranged on the sample carrier (26) and can be displaced with the sample carrier (26) when in operation.

7 Claims, 2 Drawing Sheets

REACTION CHAMBER SYSTEM FOR PROCESSING SAMPLES

Figure 1:
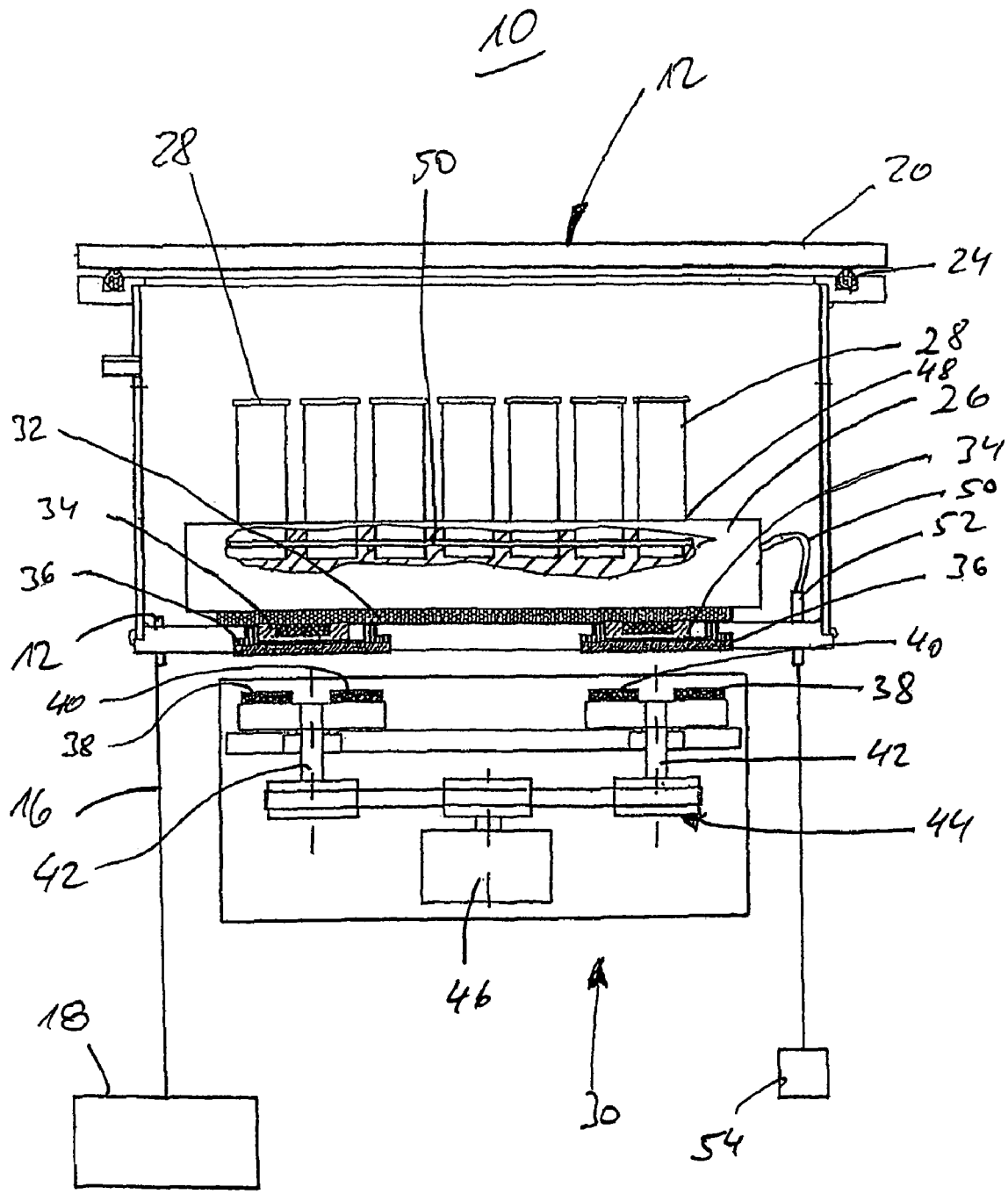

The invention concerns a reaction chamber system for processing samples according to the type indicated in the preamble of Claim 1.

Such a reaction chamber system for processing samples is known from WO 98/20965. In this reaction chamber system, several aggressive or hazardous samples, which are liquid or are dissolved in liquid, are processed simultaneously. The reaction chamber system is thereby provided with a reaction chamber in which a sample carrier is located to hold individual sample containers. During operation, the sample carrier is displaced by means of a drive that is located outside the reaction chamber and coupled magnetically with the sample carrier. The reaction chamber is closed above with a cover, which is constructed so it is transparent. Radiant heaters, in particular, infrared radiators, are located above the cover, with these helping to heat the sample found in the sample containers, if needed, during operation of the reaction chamber system. Heating the samples introduced in the sample containers is essentially effected by heat radiation, and to a lesser extent, by heat conduction. The latter occurs in that the radiant heaters also heat the sample carrier, which then heats the sample container and thus also the sample.

The reaction chamber system disclosed is part of a vacuum concentrator designed as a shaker. The reaction chamber is therefore connected with a vacuum pump via vacuum lines. The shaking movement is magnetically transferred, via the shaker drive, to the sample carrier which is located completely inside the reaction chamber.

The known reaction chamber system has the disadvantage that the heating means disclosed there have an extremely low efficiency. Moreover, the heating energy is essentially introduced into the sample from above. For most methods, however, it is advantageous if the heating energy is introduced from below. For example, when using known reaction chamber systems, the sample vessels are filled with a liquid sample and with a low-boiling solvent that evaporates in vacuum when heated. The goal is to accelerate as much as possible this evaporation of the solvent in the reaction chamber. To achieve this, the heat energy must be optimally transferred to the sample container and the sample.

A reaction chamber system is known from U.S. Pat. No. 3,977,935 that has a sample carrier for several samples. The reaction chamber is delimited by this sample carrier and a cover placed on the sample carrier. The sample carrier can be heated or cooled from outside the reaction chamber, with cooling being effected via a cooling/heating fluid and heating via a heating wire by convection in the adjacent cooling/heating fluid. All of this is connected to a shaker drive.

The disadvantage here is that the reaction chamber system is relatively large and the displaced masses are very large. In addition, the exclusive heating of the sample causes condensation in the reaction chamber that falsifies the measurement results.

An apparatus is known from EP 1 027 933 A1 for processing samples in sample containers. The sample containers are introduced in a sample container-rack, which is accommodated in a housing with a shaker motor. A heating plate, which heats the rack, the sample containers, and the samples from below, is located in the housing. The reaction chamber is formed by the sample containers and a seal plate. Thus many reaction chambers, corresponding to the number of sample containers, are provided that are connected with one another via the seal plate. The heating means and drive are located outside the reaction chamber.

The goal of the invention is to refine a reaction chamber system of the type indicated in the preamble of Claim 1, such that while avoiding the aforementioned disadvantages, an improved and purposeful reaction of the sample is made possible in the reaction chamber while retaining a specific reaction chamber construction, without the reaction being corrupted by a condensed product or the like.

This goal is attained by the characterizing features of Claim 1, in combination with its features of the preamble.

The invention is based on the knowledge that placement of the heating means as close as possible to the sample in the evacuated chamber can considerably improve the efficiency of the reaction chamber system and can thus avoid condensation by heating the reaction chamber. Moreover, this also enables better control and regulation of the heating.

According to the invention, therefore, the heating means are placed on the sample carrier inside the reaction chamber, and during operation can be displaced with the sample carrier, and are constructed in the form of at least one electrically operated heating wire. In this way, an optimal transfer of the heat energy from the source-that is, the heating means-to the samples is guaranteed. Moreover, the evacuated space-that is, the reaction chamber-is heated so that condensed product is avoided during the reaction. In addition, seal problems due to the supply of energy to the reaction chambers are not produced, since the heating wires can be simply connected to the power supply, via a contact, by the electrical line.

Advantageously, the heating means are integrated into the sample carriers and are located inside the sample carrier in a particularly self-contained manner. A space-saving construction results from this.

In order to further optimize the heat transfer to the sample, the heating means surround the samples, at least in certain areas. Advantageously, the heating means completely surround the samples, at least in certain areas. The heat energy thus acts on the sample as much as possible in various ways, wherein the heating is further accelerated.

The efficiency of the reaction chamber system with regard to heating of the samples can be further attained, for example, in that the heat transfer from the heating means to the samples essentially takes place by heat conduction.

In accordance with the embodiment of the invention, the reaction chamber can be closed in an airtight manner and can be constructed as a vacuum chamber which works together with a vacuum pump. In this way, for example, the processing steps can be carried out as required in a combinatory chemical synthesis.

The energy source of the heating means is located, in particular, outside the reaction chamber. For this purpose, at least one feeder is provided that leads outside to the heat or energy source via a chamber opening. The feeder provides the heating means with the needed energy or heat.

Advantageously, a feeder coupling is introduced into the chamber opening, by means of which the feeder is designed so that it can be separated. A simple assembly of the reaction chamber system is in this way made possible. Moreover, replacement of the sample carrier together with the heating means is readily possible, since the feeder can be separated simply from the feeder coupling, and thus from the energy source.

In order to be able to allow for the displacement of the sample carrier when it is in operation, the area of the feeder between the chamber opening and the sample carrier is dimensioned such that the feeder is long enough to allow for the displacement in this area.

In accordance with an embodiment of the invention, the sample carrier is constructed to hold sample containers which contain the samples and which are, in particular, designed to be open with respect to the reaction chamber.

In order also to enable filling and emptying the sample containers during operation of the reaction chamber system, the reaction chamber has corresponding feed line connections.

The vacuum pump is arranged separately from the reaction chamber.

The displaced masses when the reaction chamber system is being operated can be kept low in a simple manner if the sample carrier is made of a light metal alloy or of a light metal.

Advantageously, the drive is designed as a magnetic drive corresponding to WO 98/20965.

The reaction chamber system is used, in particular, as a part of a vacuum concentrator, for example, for chemical combinatorial synthesis, as an evaporator, or the like.

According to the invention, it is favorable for the sample to be essentially heated from below. Furthermore, the efficiency is increased if the sample is essentially heated by heat conduction. It is possible, however, to first heat the sample carrier and via the carrier the sample.

Figure 2:
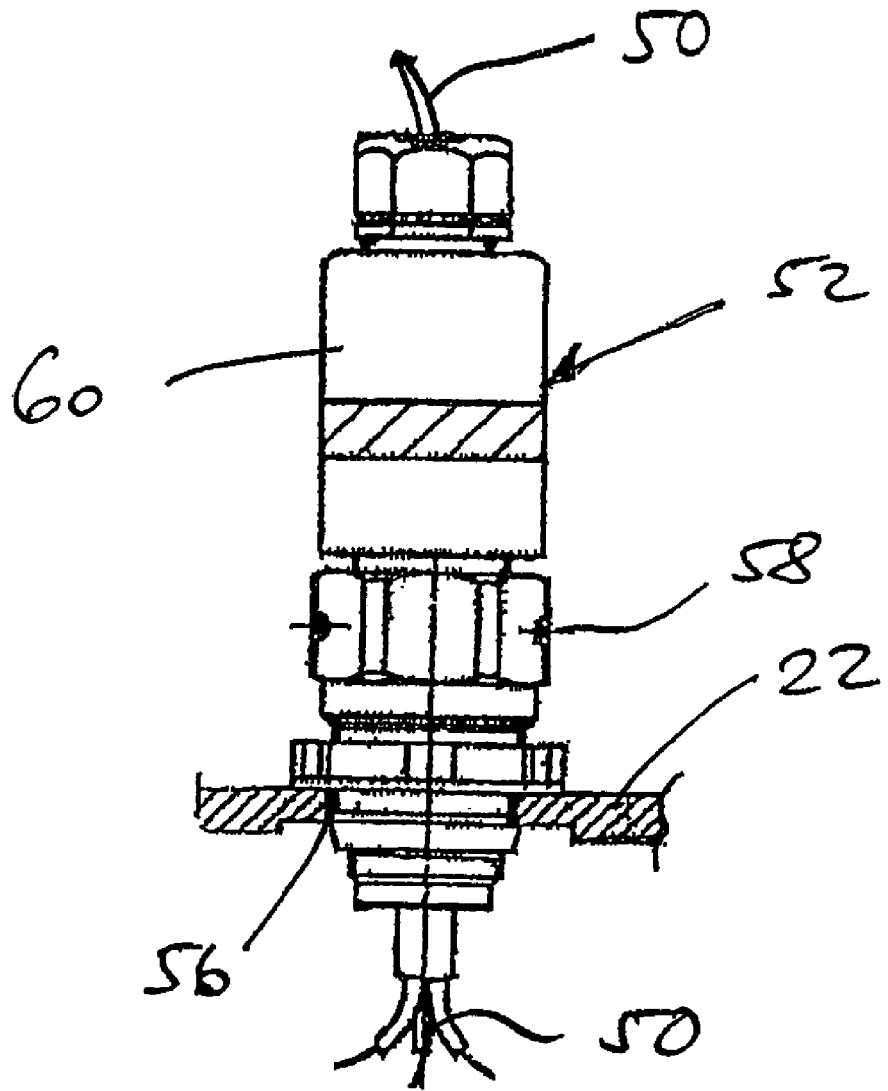

Additional advantages and features of the invention are deduced from the following description of an embodiment of the invention, in connection with the drawing. The figures show the following:

FIG. 1, a schematic side sectional view of a reaction chamber system according to the invention, with a partial section through a sample carrier according to an embodiment of the invention; and FIG. 2, an enlarged side representation of a feeder coupling of FIG. 1.

FIG. 1 shows a vacuum concentrator 10 according to a first embodiment of the invention. The vacuum concentrator 10 is a shaker for processing samples not depicted here.

The vacuum concentrator 10 consists of a reaction chamber 12, which has a connection 14. The connection 14 is connected with a high-vacuum pump 18 via a vacuum line 16. The interior of the reaction chamber 12 can be evacuated with the high-vacuum pump 18.

The reaction chamber 12 has a removable cover 20, which in the operational state closes airtight with a lower part 22. Appropriate seals 24 are provided for this purpose. A sample carrier 26, which holds several sample containers 28, is located inside the reaction chamber 12. The samples to be processed are introduced in the sample containers 28.

The sample carrier 26 works together with a shaker drive 30 and is placed on a shaking plate 32. The shaking plate 32 has support pins 34, directed downwards. The support pins 34 project into support pans 36, firmly connected with the lower part 22 of the reaction chamber 12.

The shaking plate 32 has at least three support pins 34, which project into corresponding support pans 36 of the lower part 22 of the reaction chamber 12. The sample carrier 26 stands on the support pins 34, which in turn lie in the support pans 36. The support pans 36 are made of electrically nonconducting glass inserts, while the lower part 22 of the reaction chamber 12 is made of a light metal alloy.

The shaker drive 30 is located below the reaction chamber 12. This has two driver magnets 38 and 40 below each support pan 36. These driver magnets are supported on a shaft 42. This shaft 42 works with a motor 46 via a gear 44. Two driver magnets 38 and 40 on a shaft 42 are associated with each support pan 36. All the shafts 42 are connected via the gear 44 with the motor 46, by means of which they are jointly driven.

The sample carrier 26 has recesses 48 adapted to the sample containers 28. Moreover, heating lines 50 that surround the sample containers 28 in certain areas are provided in the sample carrier 26. For this purpose, the heating lines 50 are provided adjacent to the recesses 48. The heating line 50 is connected with a coupling 52. The coupling 52 is described in more detail below, in connection with FIG. 2. Between the coupling 52 and the sample carrier 26, the heating line is dimensioned to be long enough that the shaking movements of the sample carrier 26 are allowed for during operation.

The heating lines 50 are formed by heating wires, which are heated when an electrical voltage is applied. In this respect, the coupling 52 is connected to a power supply 54.

As can be seen from FIG. 1, the heating line 50 is integrated into the sample carrier 26. The operative area is located completely inside the sample carrier 26. The heat transfer is hereby effected by heat conduction.

The coupling 52 is shown enlarged in FIG. 2. Here, the lower part 22 of the reaction chamber 12 is shown only in certain areas, and has a chamber opening 56. A lower coupling part 58 is anchored firmly in the chamber opening 56, which is securely coupled with the heating line 50 which is connected with the power supply 54. The lower coupling part is marked with the reference symbol 58 and designed as a socket, whereas the opposing upper coupling part 60 is designed as a plug.

FIG. 2 shows the coupling part 52 in the joined state, that is, the upper coupling part 60 is plugged into the lower coupling part 58.

LIST OF REFERENCE SYMBOLS

10 Vacuum concentrator
12 Reaction chamber
14 Connection
16 Vacuum line
18 High-vacuum pump
20 Cover
22 Lower part
24 Seals
26 Sample carrier
28 Sample containers
29 Seals
30 Shaker drive
32 Shaking plate
34 Support pins
36 Support pans
38 Driver magnet
40 Driver magnet
42 Shaft
44 Gear
46 Motor
48 Recesses
50 Heating lines
52 Coupling
54 Power supply
56 Chamber opening
58 Lower coupling part
60 Upper coupling part

The invention claimed is:

1. A reaction chamber system (10) for processing samples comprising;
   a reaction chamber (12);
   a plurality of sample containers (28) each sample container having an opening for receiving a sample therethrough;
   a sample carrier (26) located inside the reaction chamber (12), the sample carrier having a plurality of recesses for receiving one or more sample containers therein;

the sample carrier being movable relative to the reaction chamber (12) by a drive (30) coupled to the sample carrier (26);

heating means (50) for heating the one or more sample containers located in the sample carrier and the samples contained therein, the heating means (50) being arranged in the sample carrier adjacent the recesses and being movable with the sample carrier (26), the heating means (50) being at least one electrical heating wire integrated into the sample carrier (26) and being arranged adjacent to each recess (48), the at least one heating wire being connected to a power supply such that energizing the at least one heating wire heats each sample container disposed within a respective recess and the sample contained therein.

2. The reaction container system according to claim 1 wherein the reaction chamber (12) has a cover for providing an air-tight closure.

3. The reaction container system according to claim 2 further comprising a vacuum pump (18) for drawing a vacuum within the reaction chamber.

4. The reaction container system according to claim 1 wherein the power supply is located outside of the reaction chamber.

5. The reaction container system according to claim 4, further comprising a line coupling (52) for connecting the at least one heating wire within the reaction chamber to the power supply located outside the reaction chamber.

6. The reaction container system according to claim 1, wherein the at least one heating wire has a length within the reaction chamber sufficient to accommodate movement of the sample carrier (26) during operation.

7. The reaction container system according to claim 3, wherein the vacuum pump (18) is arranged separately from the reaction chamber (12).

* * * * *